(12) United States Patent
Kashima et al.

(10) Patent No.: US 10,927,039 B2
(45) Date of Patent: Feb. 23, 2021

(54) CHEMICALLY STRENGTHENED GLASS AND PRODUCTION METHOD FOR CHEMICALLY STRENGTHENED GLASS

(71) Applicant: AGC Inc., Chiyoda-ku (JP)

(72) Inventors: Izuru Kashima, Tokyo (JP); Yusuke Fujiwara, Tokyo (JP); Kiyoshi Tamai, Tokyo (JP); Yuichi Suzuki, Tokyo (JP); Yoichi Sera, Tokyo (JP); Daisuke Kobayashi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 737 days.

(21) Appl. No.: 15/651,353

(22) Filed: Jul. 17, 2017

(65) Prior Publication Data

US 2017/0313621 A1 Nov. 2, 2017

Related U.S. Application Data

(63) Continuation of application No. PCT/JP2016/051163, filed on Jan. 15, 2016.

(30) Foreign Application Priority Data

Jan. 20, 2015 (JP) .............................. JP2015-008853
Jul. 15, 2015 (JP) .............................. JP2015-141400

(51) Int. Cl.
*C03C 21/00* (2006.01)
*C03C 15/00* (2006.01)
(Continued)

(52) U.S. Cl.
CPC ............ *C03C 21/002* (2013.01); *C03C 3/091* (2013.01); *C03C 15/00* (2013.01); *C03C 19/00* (2013.01);
(Continued)

(58) Field of Classification Search
None
See application file for complete search history.

(56) References Cited

U.S. PATENT DOCUMENTS 5,318,830 A  6/1994 Takamatsu et al.
6,119,483 A  9/2000 Takahashi et al.
(Continued)

FOREIGN PATENT DOCUMENTS

CN  102951850 A  3/2013
CN  103827053 A  5/2014
(Continued)

OTHER PUBLICATIONS

International Search Report dated Mar. 29, 2016 in PCT/JP2016/051163 filed Jan. 15, 2016 (with English translation).
(Continued)

*Primary Examiner* — David Sample
(74) *Attorney, Agent, or Firm* — Oblon, McClelland, Maier & Neustadt, L.L.P.

(57) ABSTRACT

An object of the present invention is to provide a chemically strengthened glass that can effectively suppress strength of a glass from being deteriorated even though performing chemical strengthening and has high transmittance (that is, low reflectivity). The present invention relates to a chemically strengthened glass having a compressive stress layer formed on a surface layer thereof by an ion exchange method, in which the glass contains sodium and boron, and has a delta transmittance being +0.1% or more, and in which a straight line obtained by a linear approximation of a hydrogen concentration Y in a region of a depth X from an outermost surface of the glass satisfies a specific relational equation in X=0.1 to 0.4 (μm).

9 Claims, 7 Drawing Sheets

(51) Int. Cl.
*C03C 19/00* (2006.01)
*C03C 23/00* (2006.01)
*C03C 3/091* (2006.01)
*G02F 1/1333* (2006.01)

(52) U.S. Cl.
CPC ...... *C03C 23/0075* (2013.01); *C03C 2204/08* (2013.01); *G02F 2001/133302* (2013.01)

(56) References Cited

U.S. PATENT DOCUMENTS

| | | |
|---|---|---|
| 6,427,489 B1 | 8/2002 | Eda et al. |
| 2001/0031317 A1 | 10/2001 | Hasegawa et al. |
| 2001/0039810 A1 | 11/2001 | Eda et al. |
| 2009/0197048 A1 | 8/2009 | Amin et al. |
| 2011/0165393 A1 | 7/2011 | Bayne et al. |
| 2012/0198888 A1 | 8/2012 | Hasegawa et al. |
| 2013/0061636 A1* | 3/2013 | Imai .................. G11B 5/8404 65/30.14 |
| 2014/0227525 A1 | 8/2014 | Matsuda et al. |
| 2014/0234607 A1 | 8/2014 | Matsuda et al. |
| 2014/0248495 A1 | 9/2014 | Matsuda et al. |
| 2015/0052949 A1 | 2/2015 | Bayne et al. |
| 2016/0130178 A1* | 5/2016 | Kashima .................. C03C 3/091 428/141 |
| 2016/0130179 A1* | 5/2016 | Kashima .................. C03C 3/087 428/141 |
| 2016/0207828 A1* | 7/2016 | Kashima ............. C03C 23/0075 |

FOREIGN PATENT DOCUMENTS

| | | |
|---|---|---|
| CN | 105392750 A | 3/2016 |
| JP | 4-357134 | 12/1992 |
| JP | 10-228643 | 8/1998 |
| JP | 2002-221602 | 8/2002 |
| JP | 2005-289728 | 10/2005 |
| JP | 2009-104703 | 5/2009 |
| JP | 2011-510904 | 4/2011 |
| JP | 2011-88765 | 5/2011 |
| JP | 2013-40091 | 2/2013 |
| JP | 2013-516387 | 5/2013 |
| WO | WO2015008766 A * | 1/2015 |

OTHER PUBLICATIONS

Written Opinion dated Mar. 29, 2016 in PCT/JP2016/051163 filed Jan. 15, 2016.
S. Ito, et al. "Crack Blunting of High-Silica Glass", Journal of the American Ceramic Society, vol. 65, No. 8, 1982, 2 pages.
Won-Taek Han, et al. "Effect of residual water in silica glass on static fatigue", Journal of Non-Crystalline Solids, vol. 127, 1991, 8 pages.
Stamenko Iiievski, et al. "Practical IR extinction coefficients for water in commercial glasses determined by nuclear reaction analysis", Glastech. Ber. Glass Sci. Technol., vol. 73, No. 2, 2000, 7 pages.
"Chemical Accessories for Optical Use" Edited by Zheng Wucheng, etc., Serveying & Mapping Publishing House Published in Apr. 1985 First Edition. p. 271 (with partial English translation).
"Flat Glass Production Process and Defect Control" Edited by Peng Shou, etc., Wuhan University of Technology Press Published in Dec. 2010 First Edition, p. 322 (with partial English translation).

* cited by examiner

CHEMICALLY STRENGTHENED GLASS AND PRODUCTION METHOD FOR CHEMICALLY STRENGTHENED GLASS

TECHNICAL FIELD

The present invention relates to a chemically strengthened glass and a production method of a chemically strengthened glass.

BACKGROUND ART

To enhance the protection and beauty of a display in flat display panel devices such as digital cameras, mobile phones or personal digital assistants (PDAs), a thin plate-shaped cover glass is arranged on the front surface of a display such that a region of the cover glass is wider than an image display part. Glass has high theoretical strength, but the strength is greatly decreased by scratches made thereon. For this reason, a chemically strengthened glass having a compressive stress layer formed on the glass surface by ion exchange or the like is used as a cover glass requiring strength.

With demands of reduction in weight and reduction in thickness to a flat panel display device, a cover glass itself is required to decrease its thickness. Therefore, for the cover glass, further strength is required in the surface of the cover glass in order to satisfy the object thereof.

To enhance surface strength of a chemically strengthened glass, it is conventionally known that a surface etching treatment is performed after a chemically strengthened treatment (Patent Document 1).

Regarding strength of a glass, it is known that the strength of a glass is decreased by the presence of hydrogen (water) in a glass (Non-Patent Documents 1 and 2).

Furthermore, antireflection function is often required in various displays, and it is generally conducted in a chemically strengthened glass to impart low reflectivity by forming an antireflection film thereon (Patent Documents 2 to 5).

PRIOR ART DOCUMENTS

Patent Documents

Patent Document 1: JP-A-2013-516387
Patent Document 2: JP-A-4-357134
Patent Document 3: JP-A-2002-221602
Patent Document 4: JP-A-2011-88765
Patent Document 5: JP-A-2013-40091

Non-Patent Documents

Non-Patent Document 1: S. ITO et. al., "Crack Blunting of High-Silica Glass", Journal of the American Ceramic Society, Vol. 65, No. 8, (1982), 368-371
Non-Patent Document 2: Won-Taek Han et. al., "Effect of residual water in silica glass on static fatigue", Journal of Non-Crystalline Solids, 127, (1991) 97-104

SUMMARY OF THE INVENTION

Problems that the invention is to Solve

The present inventors have found that strength of a glass is sometimes decreased after chemical strengthening, and the main cause thereof is that water in the atmosphere enters a glass surface layer and thereby chemical defects are formed. They have further found that this phenomenon occurs by not only chemical strengthening, but passing through a temperature rising step in a production process of a glass.

It is considered as a method of removing water in a glass surface layer to scrape off a water-containing layer by a method such as polishing a glass surface after chemical strengthening or dipping a glass in hydrofluoric acid or the like to perform an etching treatment. However, there is a possibility that a glass surface is damaged by polishing and strength is rather deteriorated. Additionally, there is a possibility that warpage of a glass increases due to polishing. Furthermore, in the case where latent scratches are present on a glass surface, latent scratches may expand by an etching treatment using hydrofluoric acid or the like, and there is a possibility of the occurrence of poor appearance by pits. Furthermore, hydrofluoric acid requires care in handling from the standpoint of safety.

In the conventional techniques of imparting low reflectivity to a chemically strengthened glass, there is a room for improvement in the standpoints of production costs and productivity. Particularly, the treatment of both surfaces and large area of a chemically strengthened glass was difficult.

An object of the present invention is to provide a chemically strengthened glass that can effectively suppress strength of a glass from being deteriorated even though performing chemical strengthening and has high transmittance (that is, low reflectivity).

Means for Solving the Problems

The present inventors have found that in a chemically strengthened glass containing boron, surface strength of the glass can be remarkably enhanced and transmittance of the glass can be enhanced, by setting a hydrogen concentration profile in a surface layer of the glass to a specific range and setting delta transmittance to a specific range without subjecting the glass surface after chemically strengthening to polishing or an etching treatment using hydrofluoric acid or the like, and have completed the present invention.

One embodiment of the present invention is as below.
<1>
A chemically strengthened glass having a compressive stress layer formed on a surface layer thereof by an ion exchange method, in which:
the glass contains sodium and boron, and
has a delta transmittance measured by the following method being +0.1% or more; and in which
a straight line obtained by a linear approximation of a hydrogen concentration Y in a region of a depth X from an outermost surface of the glass satisfies the following relational equation (I) in X=0.1 to 0.4 (µm):

$$Y = aX + b \tag{I}$$

[in the equation (I), meanings of each symbol are as follows:
Y: hydrogen concentration (in terms of $H_2O$, mol/L);
X: depth from outermost surface of glass (µm);
a: −0.390 to −0.010; and
b: 0.060 to 0.250],
Measurement Method of the Delta Transmittance:
a chemically strengthened glass is cut into two pieces to prepare glass A and glass B; transmittance at a wavelength of 400 nm of the glass A is measured by using an ultraviolet-visible spectrophotometer (SolidSpec-3700), manufactured by Shimadzu Corporation; the glass B is subjected to an etching treatment with a mixed liquid of HF and HCl such that a removal amount in one side of the glass is 0.05 to 0.10 mm; the glass B having been subjected to the etching treatment is subjected to a chemically strengthening treatment; in the chemically strengthening treatment, the glass B is brought into contact with a molten salt, obtained by heating an inorganic salt of 100 wt % potassium nitrate at 450° C., for 2 hours; the transmittance at a wavelength of 400 nm of the glass B after the chemically strengthening treatment is measured in the same method as in the glass A; and the delta transmittance is obtained by subtracting the transmittance of the glass B from the transmittance of the glass A.

<2>

The chemically strengthened glass according to <1> above, in which the glass is a borosilicate glass or an aluminoborosilicate glass.

<3>

The chemically strengthened glass according to <1> or <2> above, in which an edge surface connecting main surfaces on a front side and a back side of the glass has an arithmetic mean roughness Ra being 300 nm or less.

<4>

A production method of a chemically strengthened glass including a step of bringing a glass containing sodium and boron into contact with an inorganic salt containing potassium nitrate, to ion-exchange Na in the glass with K in the inorganic salt, in which the inorganic salt further contains at least one kind of salt selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, and NaOH, and the method further includes:

a step of cleaning the glass after the ion exchange; and a step of acid-treating the glass after the cleaning.

<5>

The production method of a chemically strengthened glass according to <4> above, further including, before the ion exchange step, a step of mirror polishing an edge surface connecting main surfaces on a front side and a back side of the glass such that an arithmetic mean roughness Ra thereof is 300 nm or less.

Advantageous Effects of the Invention

According to the chemically strengthened glass of one embodiment of the present invention, a chemically strengthened glass having enhanced surface strength and high transmittance can be provided by setting a hydrogen concentration profile in a surface layer of the chemically strengthened glass to a specific range and setting delta transmittance to a specific range.

Furthermore, according to the production method of a chemically strengthened glass of one embodiment of the present invention, a chemically strengthened glass having enhanced surface strength and low reflectivity is obtained by using a single glass as a raw material and forming a compressive stress layer on the surface thereof and forming a low density layer on a top surface of the compressive stress layer. As a result, low reflection treatment can be applied to a large-sized glass or both surfaces of a glass, and this is very useful.

MODE FOR CARRYING OUT THE INVENTION

Figure 1:
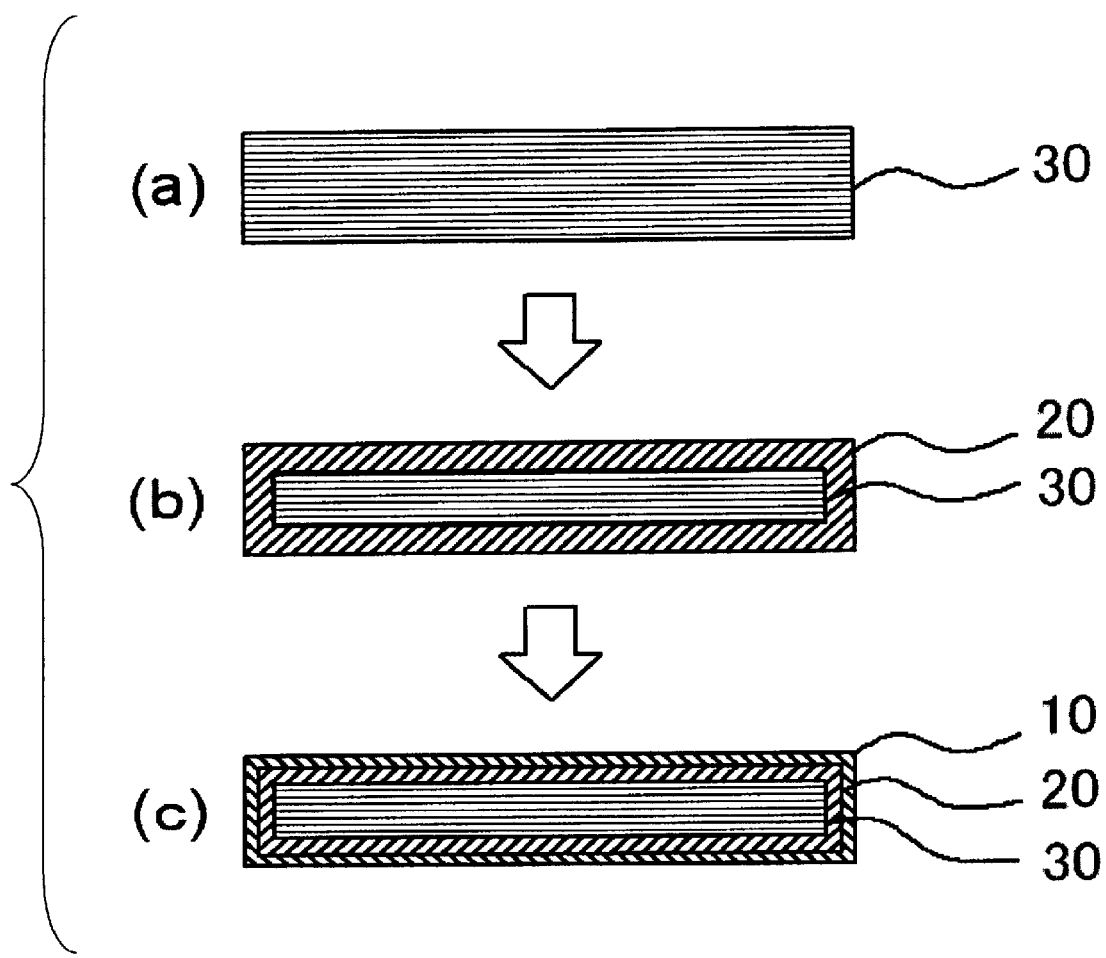
FIG. 1(a) are schematic views illustrating production steps of the chemically strengthened glass according to the present embodiment.

A certain embodiment of the present invention is described in detail below, but the present invention is not limited to the following embodiments and can be carried out by optionally modifying within the scope that does not depart from the gist of the present invention.

In the present description, "mass %" is synonymous with "wt %" and "mass ppm" is synonymous with "wt ppm". Furthermore, in the case of simply describing as "ppm", it means "wt ppm".

<Chemically Strengthened Glass>

The chemically strengthened glass according to the present embodiment has an ion-exchanged compressive stress layer on the glass surface.

In the present description, the compressive stress layer is a high density layer formed by bringing a glass as a raw material into contact with an inorganic salt such as potassium nitrate, thereby ion-exchanging metal ions (Na ions) on the glass surface with ions having large ionic radius (K ions) in the inorganic salt. When the glass surface is densified, compressive stress is generated, and a glass can be strengthened.

(Composition of Glass)

The glass used in the present embodiment only needs to contain boron and sodium, and ones having various compositions can be used so long as it has a composition capable of forming and strengthening by a chemically strengthening treatment. Examples thereof specifically include a borosilicate glass and an aluminoborosilicate glass.

When a glass contains boron, a chemically strengthened glass excellent in balance between surface strength and transmittance can be obtained. Furthermore, the glass containing boron has the characteristics of both low brittleness and high hardness, and therefore is suitable for a chemically strengthened glass requiring high strength. Additionally, the glass containing much boron has low acid resistance, and therefore is easy to be treated with chemicals such as an acid.

The content of $B_2O_3$ is, in a composition indicated in mol % on the basis of oxides, preferably 0.5% or more, more preferably 1% or more, still more preferably 2% or more, still further preferably 3% or more, and particularly preferably 4% or more. When the content of $B_2O_3$ is 0.5% or more, a chemically strengthened glass that is excellent in balance between surface strength and transmittance, has the characteristics of both low brittleness and high hardness, and is easy to be treated with chemicals such as an acid, can be obtained. The content of $B_2O_3$ is preferably 20% or less, more preferably 15% or less, still more preferably 10% or less, still further preferably 8% or less, and particularly preferably 6% or less. When the content of $B_2O_3$ is 20% or less, acid resistance is not excessively decreased.

$SiO_2$ is an essential component constituting a skeleton of a glass, and is a component reducing generation of cracks when scratches (impressions) have been formed on a glass surface, or decreasing a fracture rate when impressions have been formed after chemical strengthening. When $SiO_2$ is 56% or more in a composition indicated in mol % on the basis of oxides, stability, acid resistance, weather resistance, or chipping resistance as a glass is enhanced, which is therefore preferable. $SiO_2$ is more preferably 58% or more, and still more preferably 60% or more. When $SiO_2$ is 72% or less, viscosity of a glass is decreased, thereby enhancing meltability, or surface compressive stress is easy to increase, which is therefore preferable. It is more preferably 70% or less, and still more preferably 69% or less.

$Al_2O_3$ is an effective component for enhancing ion exchangeability and chipping resistance, is a component increasing surface compressive stress, or is an essential component decreasing a rate of occurrence of cracks when impressions have been formed by a 110° indenter. When $Al_2O_3$ is 8% or more in a composition indicated in mol % on the basis of oxides, desired surface compressive stress value or compressive stress layer thickness can be obtained by ion exchange, which is therefore preferable. It is more preferably 9% or more, and still more preferably 10% or more. When $Al_2O_3$ is 20% or less, viscosity of a glass is decreased and uniform melting is easy, or acid resistance is enhanced, which is therefore preferable. $Al_2O_3$ is more preferably 18% or less, still more preferably 16% or less, and particularly preferably 14% or less.

$Na_2O$ is an essential component that forms a surface compressive stress layer by ion exchange and improves meltability of a glass. When $Na_2O$ is 8% or more in a composition indicated in mol % on the basis of oxides, it is easy to form a desired surface compressive stress layer by ion exchange, which is therefore preferable. It is more preferably 9% or more, still more preferably 10% or more, and particularly preferably 11% or more. When $Na_2O$ is 25% or less, weather resistance or acid resistance is enhanced, or cracks are difficult to be generated from impressions, which is therefore preferable. It is more preferably 22% or less, and still more preferably 21% or less. In the case of particularly requiring to enhance acid resistance, $Na_2O$ is preferably 17% or less, and more preferably 16.5% or less.

More specifically, examples of the glass composition include the followings.

A glass containing, in a composition indicated in mol % on the basis of oxides, 56 to 72% of $SiO_2$, 8 to 20% of $Al_2O_3$, 3 to 20% of $B_2O_3$, 8 to 25% of $Na_2O$, 0 to 5% of $K_2O$, 0 to 15% of MgO, 0 to 15% of CaO, 0 to 15% of $SrO_2$, 0 to 15% of BaO, and 0 to 8% of $ZrO_2$.

(Delta Transmittance)

The chemically strengthened glass of the present embodiment has delta transmittance of +0.1% or more, and preferably +0.2% or more. In the present embodiment, the delta transmittance is calculated by the following method. When the delta transmittance is plus, it can be said that the chemically strengthened glass of the present embodiment is a glass having high transmittance.

[Calculation Method of Delta Transmittance]

A chemically strengthened glass is cut into two pieces to prepare glass A and glass B. Transmittance at a wavelength of 400 nm of the glass A is measured by using ultraviolet-visible spectrophotometer (SolidSpec-3700), manufactured by Shimadzu Corporation. The glass B is subjected to an etching treatment with a mixed liquid of HF and HCl such that a removal amount in one side of the glass is 0.05 to 0.10 mm. The glass B having been subjected to the etching treatment is subjected to a chemically strengthening treatment. In the chemically strengthening treatment, the glass B is brought into contact with a molten salt, obtained by heating an inorganic salt of 100 wt % potassium nitrate at 450° C., for 2 hours. The transmittance at a wavelength of 400 nm of the glass B after the chemically strengthening treatment is measured in the same method as in the glass A. The delta transmittance is obtained by subtracting the transmittance of the glass B from the transmittance of the glass A.

(Hydrogen Concentration Profile)

In the chemically strengthened glass of the present embodiment, a hydrogen concentration profile in a glass surface layer is within a specific range. Specifically, a straight line obtained by a linear approximation of a hydrogen concentration Y in a region of a depth X from the outermost surface of the glass satisfies the following relational equation (I) in X=0.1 to 0.4 (μm).

$$Y = aX + b \quad (I)$$

[In the equation (I), the meanings of each symbol are as follows:

Y: hydrogen concentration (in terms of $H_2O$, mol/L);

X: depth from outermost surface of glass (μm);

a: −0.390 to −0.010; and b: 0.060 to 0.250]

Regarding strength of a glass, it is known that strength of a glass is decreased by the presence of hydrogen (water) in a glass. The present inventors have found that strength is sometimes decreased after chemical strengthening treatment, and the main cause thereof is that water in the atmosphere enters a glass and thereby chemical defects are formed. It has been further found that this phenomenon occurs by not only chemical strengthening, but passing through a temperature rising step in a production process of a glass.

When a hydrogen concentration in a glass is high, hydrogen enters connection network of Si—O—Si of a glass in the form of Si—OH and the connection of Si—O—Si is broken. It is considered that when a hydrogen concentration in a glass is high, the portion in which the connection of Si—O—Si is broken increases, chemical defects are easy to be formed, and strength is thereby decreased.

The relational equation (I) holds in a region of a depth X=0.1 to 0.4 μm from the outermost surface. The thickness of a compressive stress layer formed by ion exchange depends on the degree of chemical strengthening, but it is formed in a range of 5 to 50 The depth of hydrogen entering a glass depends on a diffusion coefficient, a temperature and time, and the entering amount of hydrogen is influenced by the amount of water in the atmosphere in addition to those factors. The hydrogen concentration after chemical strengthening is highest in the outermost surface, and is gradually decreased toward a deep portion (bulk) in which a compressive stress layer is not formed. The relational equation (I) defines the degree of decrease, but there is a possibility that the water concentration varies by change in quality with time at the outermost surface (X=0 μm). Therefore, it was determined that the equation holds in a region of near surface (X=0.1 to 0.4 μm) which is considered to be free of the influence.

In the equation (I), a is a gradient defining the degree of decrease of the hydrogen concentration. The range of a is −0.390 to −0.010, preferably −0.280 to −0.030, and more preferably −0.170 to −0.050.

In the equation (I), b corresponds to the hydrogen concentration at the outermost surface (X=0 μm). The range of b is 0.060 to 0.250, preferably 0.080 to 0.220, and more preferably 0.100 to 0.190.

It is generally considered that the decrease of strength of a glass is due to that microcracks present on the glass surface extend by mechanical pressure from the outside. According to Non-Patent Document 2, it is considered that cracks are easy to extend as glass structure at a tip of cracks is in Si—OH rich state. Assuming that the tip of cracks is exposed in the atmosphere, it is estimated that Si—OH amount at the tip of cracks show a positive correlation with the hydrogen concentration on the outermost surface of a glass. Therefore, it is preferred that b corresponding the hydrogen concentration on the outermost surface is within low range in the degree shown above.

Figure 4:
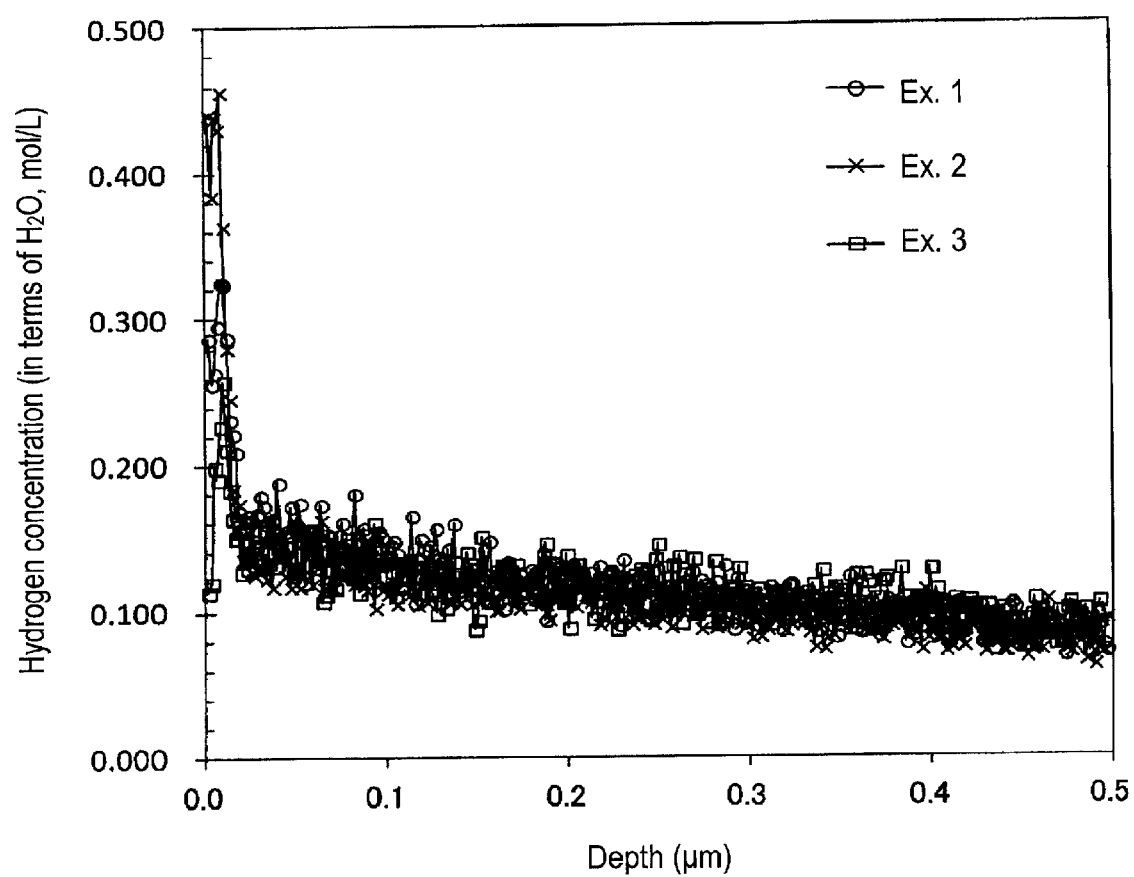
FIG. 4 is a graph in which hydrogen concentration profiles in a surface layer of the chemically strengthened glasses obtained in Example 1 to Example 3 are plotted.
Figure 5:
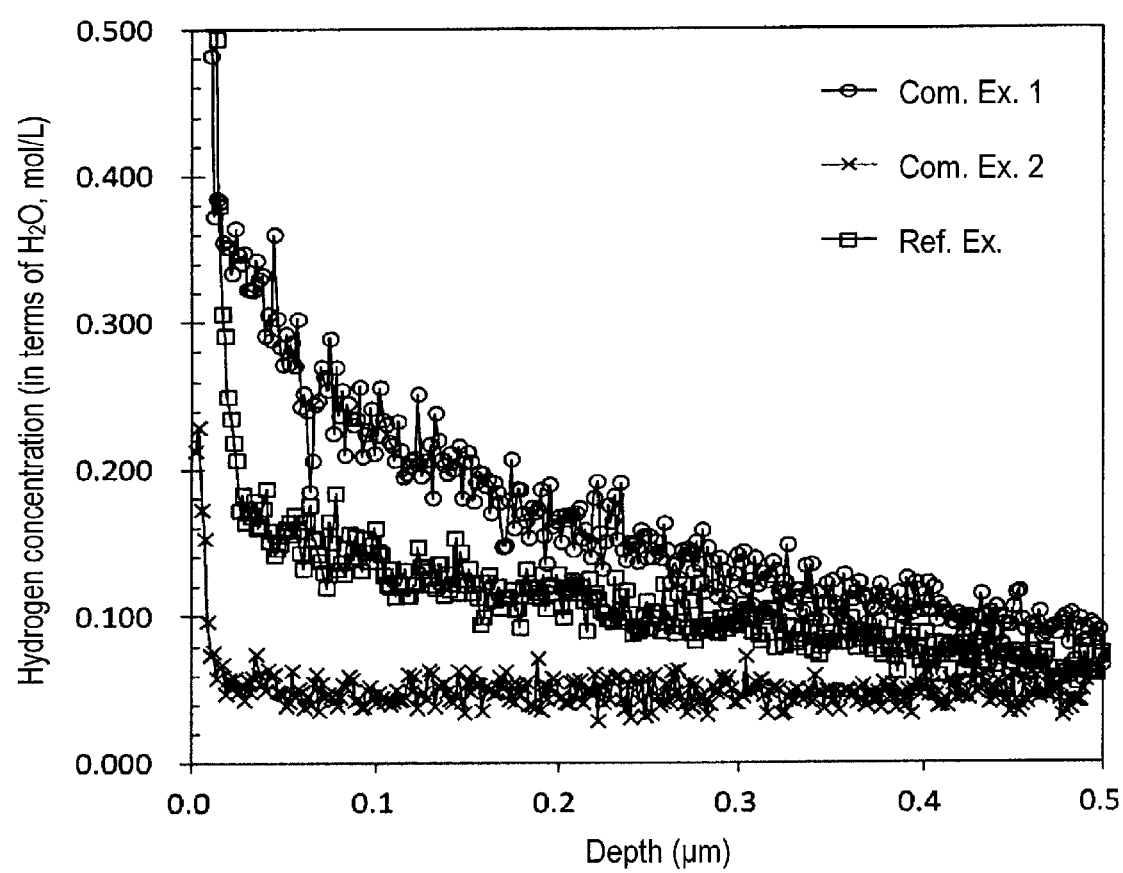
FIG. 5 is a graph in which hydrogen concentration profiles in a surface layer of the chemically strengthened glasses obtained in Comparative Example 1, Comparative Example 2 and Reference Example are plotted.

As shown in FIG. 4 and FIG. 5, regarding the glass having passed through the chemically strengthening step, remarkable difference was not recognized in the entering depth of hydrogen. There is high possibility that the entering depth of hydrogen changes depending on the conditions of the chemically strengthening step, but assuming that it does not change, negative correlation is observed in b corresponding to the hydrogen concentration on the outermost surface and a corresponding to a gradient defining the degree of decrease of the hydrogen concentration. Therefore, a is preferably high range in the degree shown above.

Thus, in the present invention, not only the hydrogen concentration itself in the surface layer is defined, but a hydrogen concentration profile is focused on, and it has been found that strength of a chemically strengthened glass can be greatly enhanced by setting the hydrogen concentration in the surface layer and its degree of decrease to specific ranges.

[Measurement Method of Hydrogen Concentration Profile]

The hydrogen concentration profile ($H_2$concentration, mol/L) of a glass used herein is a profile measured under the following analytical conditions.

Secondary Ion Mass Spectrometry (SIMS) was used for the measurement of the hydrogen concentration profile of a glass substrate. Standard sample having the known hydrogen concentration is required in the case of obtaining quantitative hydrogen concentration profile with SIMS. Preparation method of a standard sample and a quantitative method of a hydrogen concentration are described below.

1) A part of a glass substrate to be measured is cut out.

2) A region of 50 μm or more from the surface of the cut glass substrate is removed by polishing or chemical etching. The removal treatment is performed on both surfaces. That is, the removal thickness in both surfaces is 100 μm or more. The removal-treated glass substrate is used as a standard sample.

3) The standard sample is subjected to Infrared Spectroscopy (IR) to obtain absorbance height $A_{3550}$ of a peak top in the vicinity of 3550 cm$^{-1}$ of IR spectrum and absorbance height $A_{4000}$ (base line) at 4000 cm$^{-1}$ of IR spectrum.

4) Sheet thickness d (cm) of the standard sample is measured by using a sheet thickness measuring instrument such as a micrometer.

5) Infrared practical absorbance coefficient $\varepsilon_{pract}$ (L/(mol·m)) of $H_2O$ in a glass is set to 75 by reference to Literature A, and the hydrogen concentration (in terms of $H_2O$, mol/L) of the standard sample is obtained by using the equation II.

Hydrogen concentration of standard sample=$(A_{3550}-A_{4000})/(\varepsilon_{pract} \cdot d)$  Equation II Literature A: S. Ilievski et al., Glastech. Ber. Glass Sci. Technol., 73 (2000) 39.

The glass substrate to be measured and the standard sample having the known hydrogen concentration obtained by the above method are simultaneously carried into SIMS apparatus, and measurements are performed in order, thereby obtaining profiles in a depth direction of strength of $^1H^-$ and $^{30}Si^-$. Thereafter, $^1H^-$ profile is divided by $^{30}Si^-$ profile to obtain a profile in a depth direction of $^1H^-/^{30}Si^-$ strength ratio. From the profile in a depth direction of $^1H^-/^{30}Si^-$ strength ratio of the standard sample, average $^1H^-/^{30}Si^-$ strength ratio in a region of a depth of from 1.0 μm to 1.3 μm is calculated and a calibration curve between this value and the hydrogen concentration is prepared so as to pass through the original point (calibration curve in a standard sample of level 1). The $^1H^-/^{30}Si^-$ strength ratio in a vertical axis of the profile of the glass substrate to be measured is converted into a hydrogen concentration by using the calibration curve, thereby obtaining a hydrogen concentration profile of the glass substrate to be measured. Measurement conditions of SIMS and IR are as follows.

[Measurement Conditions of SIMS]

Apparatus: ADEPT 1010, manufactured by ULVAC-PHI, Inc.

Primary ion species: Cs$^+$

Accelerated voltage of primary ion: 5 kV

Current value of primary ion: 50 nA

Incident angle of primary ion: 60° relative to normal line of sample face

Luster size of primary ion: 300×300 μm$^2$

Polarity of secondary ion: minus

Detection region of primary ion: 60×60 μm$^2$ (4% of luster size of primary ion)

Use of neutralization gun: used

Method of converting a horizontal axis into depth from sputtering time: Depth of analytical crater is measured with a stylus type surface shape measuring instrument (Dektak 150, manufactured by Veeco Instruments Inc.) to obtain a sputter rate of primary ions. By using the sputter rate, a horizontal axis is converted into a depth from sputtering time.

Field axis potential when detecting $^1H^-$: There is a possibility that an optimum value changes for every apparatus. The value is set while a measurer pays attention such that background is sufficiently cut.

[Measurement Conditions of IR]

Apparatus: Nic-plan/Nicolet 6700, manufactured by Thermo Fisher Scientific Co.

Resolving power: 4 cm$^{-1}$

Integration: 16

Detector: TGS detector

Figure 6:
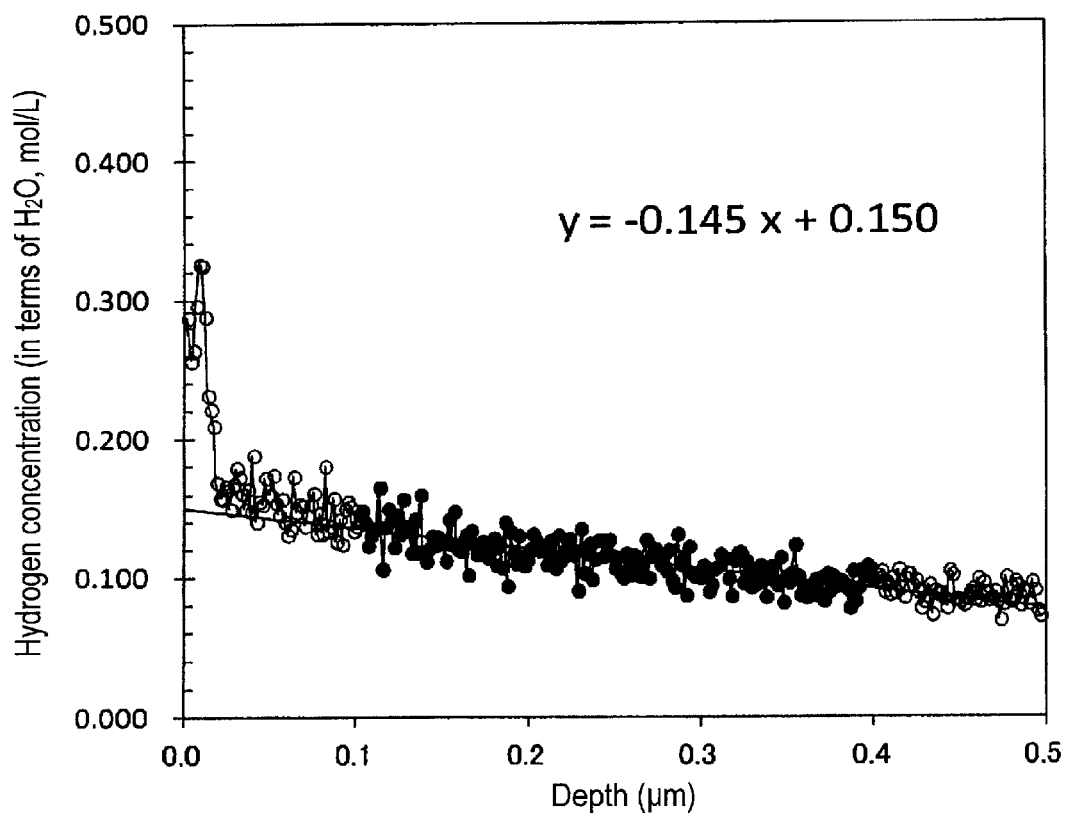
FIG. 6 is an explanatory view for deriving the relational equation (I) from a graph having plotted thereon hydrogen concentration profiles in a surface layer of the chemically strengthened glass obtained in Example 1.
Figure 7:
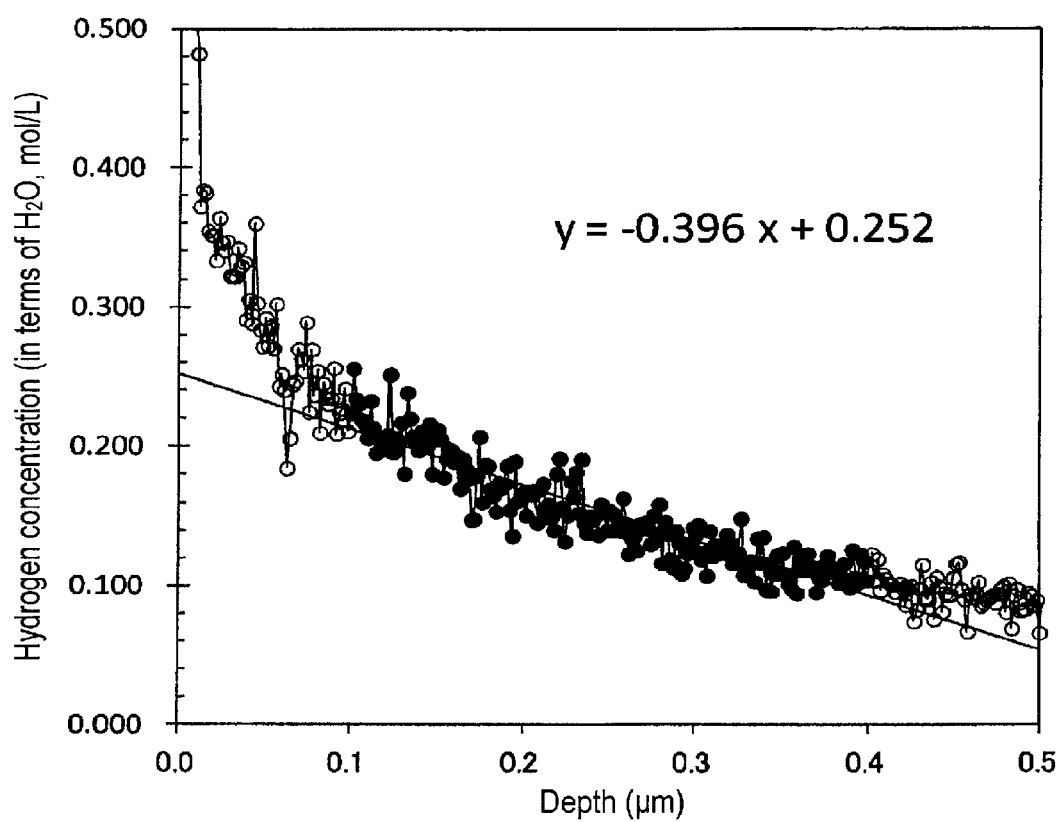
FIG. 7 is an explanatory view for deriving the relational equation (I) from a graph having plotted thereon hydrogen concentration profiles in a surface layer of the chemically strengthened glass obtained in Comparative Example 1.

The relational equation (I) is derived from a hydrogen concentration profile ($H_2O$ concentration, mol/L) of a glass measured by the above analytical conditions by the following procedures. As shown in FIG. 6 and FIG. 7, linear approximation is performed to a hydrogen concentration profile in a region of a depth of 0.1 to 0.4 μm. The equation of approximation straight line obtained is used as the relational equation (I).

The means for controlling a and b includes alternation of flux concentration, sodium concentration, temperature, time and the like in a chemically strengthening step.

(Strength of Glass Surface)

The strength (surface strength) of the chemically strengthened glass of the present embodiment can be evaluated by a ball on ring (BOR) test.

(Ball on Ring Test)

The chemically strengthened glass of the present embodiment is evaluated by BOR surface strength F (N) measured by a BOR test in which a glass sheet is arranged on a ring made of a stainless steel having a diameter of 30 mm and a roundness such that a contact part has a curvature of radius of 2.5 mm and, in the state that a sphere made of a steel having a diameter of 10 mm has been brought into contact with the glass sheet, a load of the sphere is applied to the center of the ring under static load conditions.

The chemically strengthened glass of the present embodiment satisfies preferably $F \geq 1500 \times t^2$, and more preferably $F \geq 2000 \times t^2$ [in the formulae, F is BOR surface strength (N) measured by the BOR test, and t is a sheet thickness (mm) of the glass substrate]. When the BOR surface strength F (N) is within the range, an excellent surface strength can be exhibited even in the case where the thickness of the sheet is decreased.

Figure 2:
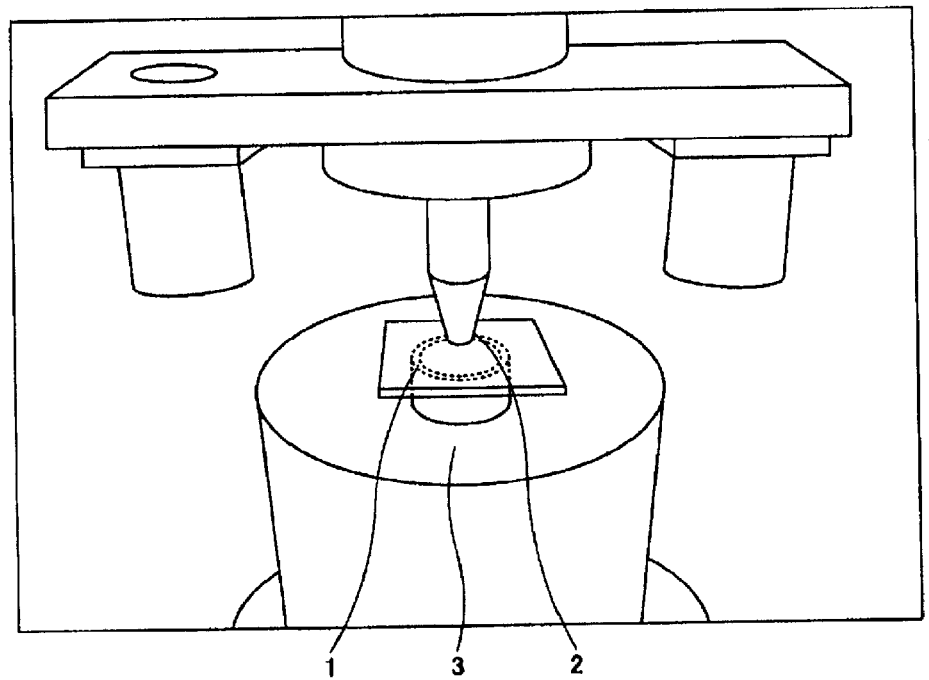
FIG. 2 is a schematic view for explaining a method of a ball on ring test.

A schematic view for explaining the BOR test used in the present embodiment is illustrated in FIG. 2. In the BOR test, a glass sheet 1 is pressurized by using a pressing jig 2 made of SUS304 (hardened steel, diameter 10 mm, mirror finishing) in the state that the glass sheet 1 is placed horizontally, and surface strength of the glass sheet 1 is measured.

In FIG. 2, the glass sheet 1 as a sample is horizontally provided on a receiving jig 3 made of SUS304 (diameter: 30 mm, curvature R of contact part: 2.5 mm, contact part is hardened steel, mirror finishing). The pressing jig 2 for pressurizing the glass sheet 1 is provided above the glass sheet 1.

In the present embodiment, from the above of the glass sheet 1 obtained after the Examples and Comparative Examples, a central region of the glass sheet 1 is pressurized. The test conditions are as follows.

Lowering speed of pressurizing jig 2: 1.0 (mm/min)

In this case, fracture load (unit: N) when a glass was fractured is used as BOR surface strength, and an average value of the measurements of 20 times is used as BOR average surface strength. However, in the case where a fracture origin of a glass sheet is 2 mm or more apart from a ball pushing position, the case is eliminated from data for calculating an average value.

(Surface Roughness of Edge Surface)

In the chemically strengthened glass of the present embodiment, arithmetic mean roughness Ra of a glass edge surface is preferably 300 nm or less, more preferably 50 nm or less, and still more preferably 20 nm or less. When the arithmetic mean roughness Ra of a glass edge surface is within the range, a glass having particularly high bending strength can be obtained.

The arithmetic mean roughness of a glass edge surface can be measured based on JIS B0601 (2001). As the measurement instrument, for example, Surfest SV-600, manufactured by Mitsutoyo Corporation can be used. After setting a measurement sample at a predetermined position, reference length, interval number and pitch defined in JIS B0601 are set, and measurement is performed. Measurement scan rate is set to 0.5 mm/sec.

(Glass Bending Strength (Edge Surface Strength))

As the bending strength in the present embodiment, four-point bending strength measured by the test method defined in JIS R1601 (2008) is used as an index. The chemically strengthened glass of the present embodiment has bending strength measured by that method of 300 MPa or more, preferably 500 MPa or more, and more preferably 1000 MPa or more.

The chemically strengthened glass of the present embodiment further has the following physical properties.

Surface roughness of the main surface in a measurement range of 10 μm×5 μm measured by AFM surface observation is preferably 0.21 nm to 1.0 nm. The surface roughness of a conventional chemically strengthened glass sheet is 0.15 nm to 0.2 nm.

<Production Method of Chemically Strengthened Glass>

The production method of a glass is not particularly limited, and production can be performed by charging desired glass raw materials in a continuous melting furnace, heating and melting the glass raw materials at a temperature of preferably 1500 to 1600° C., performing fining, and then performing feeding into a forming apparatus, forming the molten glass into a plate shape, and performing annealing.

Various methods can be used in forming the glass. For example, forming methods such as a downdraw process (for example, overflow downdraw process, a slot down process and a redraw process), a float process, a rollout process, and a pressing process can be used.

The thickness of a glass is not particularly limited. To effectively perform a chemically strengthening treatment, it is preferably 5 mm or less, and more preferably 3 mm or less. Furthermore, the sheet thickness is still more preferably 1 mm or less, and particularly preferably 0.7 mm or less, from the standpoint that the enhancement effect of surface strength by an acid treatment described hereinafter is particularly appeared.

The shape of the glass used in the present embodiment is not particularly limited. For example, glasses having various shapes such as a flat plate shape having a uniform sheet thickness, a shape having a curved surface on at least one of a front surface and a back surface, and a three-dimensional shape having a bending part can be used.

The chemically strengthened glass of the present embodiment has an ion-exchanged compressive stress layer on the glass surface. In the ion-exchange method, the surface of the glass is ion-exchanged to form a surface layer having residual compressive stress. Specifically, alkali metal ions (typically, Li ion and Na ion) having small ionic radius on the surface of a glass sheet are substituted with alkali ions (typically, Na ion or K ion in the case of Li ion, and K ion in the case of Na ion) having larger ionic radius by ion exchange at a temperature equal to or lower than a glass transition point. Thereby, compressive stress remains on the surface of a glass, and strength of a glass is enhanced.

In the production method of the present embodiment, chemical strengthening is conducted by bringing a glass into contact with an inorganic salt containing potassium nitrate ($KNO_3$). Na ions on the surface of a glass are ion-exchanged with K ions in the inorganic salt by this, and a compressive stress layer having high density is thus formed. As the method for bringing a glass into contact with an inorganic salt, a method of applying a paste-like inorganic salt, a method of jetting an inorganic salt aqueous solution to a glass, a method of dipping a glass in a salt bath of a molten salt heated to equal to or higher than the melting point thereof, and the like are possible. Of those, a method of dipping in a molten salt is desirable.

The inorganic salt is preferably one having the melting point equal to or lower than the strain point (generally 500 to 600° C.) of a glass to be chemically strengthened, and in the present embodiment, a salt containing potassium nitrate (melting point: 330° C.) is preferred. When potassium nitrate is contained, it is in a molten state at equal to or lower than the strain point of a glass and handling becomes easy in a used temperature region, which is therefore preferable. It is preferred that the content of potassium nitrate in the inorganic salt is 50 mass % or more.

It is preferred that the inorganic salt further contains at least one kind of salt selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, and NaOH. Above all, it is more preferred to contain at least one kind of salt selected from the group consisting of $K_2CO_3$, $Na_2CO_3$, $KHCO_3$, and $NaHCO_3$.

The salt (hereinafter sometimes referred to as a "flux") has a property of cutting network of a glass, represented by Si—O—Si bond. The temperature at which chemical strengthening is conducted is high as several hundreds ° C. Therefore, a covalent bond between Si—O of a glass is appropriately cut at the temperature, and the decrease of density by an acid treatment described hereinafter is easy to proceed.

The degree of cutting a covalent bond varies depending on a composition of a glass, a kind of a salt (flux) used, and chemical strengthening treatment conditions such as a temperature, time and the like for conducting a chemically strengthening treatment. It is considered to be preferable to select the condition of an extent such that 1 to 2 bonds of 4 covalent bonds extending from Si are cut.

For example, in the case of using $K_2CO_3$ as a flux, when the content of the flux in the inorganic salt is 0.1 mol % or more and the chemical strengthening treatment temperature is 350 to 500° C., the chemical strengthening treatment time is preferably 1 minute to 10 hours, more preferably 5 minutes to 8 hours, and still more preferably 10 minutes to 4 hours.

From the standpoint of control of a surface hydrogen concentration, the addition amount of a flux is preferably 0.1 mol % or more, more preferably 0.5 mol % or more, still more preferably 1 mol % or more, and particularly preferably 2 mol % or more. Furthermore, from the standpoint of productivity, it is preferably an amount of equal to or less than the saturated solubility of each salt. Excessive addition thereof may lead to corrosion of a glass. For example, in the case of using $K_2CO_3$ as the flux, it is preferably 24 mol % or less, more preferably 12 mol % or less, and particularly preferably 8 mol % or less.

The inorganic salt may further contain other chemical species in a range that does not impair the effect of the present invention, in addition to potassium nitrate and the flux, and examples thereof include alkali hydrochlorides and alkali borates such as sodium chloride, potassium chloride, sodium borate, and potassium borate. Those may be added alone or may be added as mixtures of plural species thereof.

The production method of a certain embodiment of the present invention is described below by reference to an embodiment in which chemical strengthening is performed by a method of dipping a glass in a molten salt.

(Production 1 of Molten Salt)

Molten salt can be produced by the following steps.

Step 1a: Preparation of potassium nitrate molten salt
Step 2a: Addition of flux to potassium nitrate molten salt
(Step 1a—Preparation of Potassium Nitrate Molten Salt—)

In the step 1a, potassium nitrate is charged in a vessel, followed by heating to a temperature equal to or higher than the melting point and melting, whereby preparing a molten salt. The melting is conducted at a temperature in a range between the melting point (330° C.) of potassium nitrate and the boiling point (500° C.) thereof. Particularly, setting the melting temperature to 350 to 470° C. is more preferred from the standpoints of the balance between surface compressive stress (CS) that can be applied to a glass and a depth of a compressive stress layer (DOL), and strengthening time.

For the vessel for melting potassium nitrate, a metal, quartz, ceramics, or the like can be used. Above all, a metal material is desirable from the standpoint of durability, and a stainless steel (SUS) material is preferable from the standpoint of corrosion resistance.

(Step 2a—Addition of Flux to Potassium Nitrate Molten Salt—)

In the step 2a, the flux described before is added to the potassium nitrate molten salt prepared in the step 1a, followed by mixing, so that the entire becomes uniform, by a stirring blade or the like while maintaining the temperature within a certain range. In the case of using a plurality of fluxes in combination, the order of addition thereof is not limited, and those may be simultaneously added.

The temperature is preferably equal to or higher than the melting point of potassium nitrate, specifically 330° C. or higher, and more preferably 350 to 500° C. The stirring time is preferably 1 minute to 10 hours, and more preferably 10 minutes to 2 hours.

(Production 2 of Molten Salt)

The method of adding a flux after the preparation of the molten salt of potassium nitrate is exemplified in the production 1 of a molten salt. The molten salt can also be produced by the following steps.

Step 1b: Mixing of potassium nitrate and flux
Step 2b: Melting of mixed salt of potassium nitrate and flux
(Step 1b—Mixing of Potassium Nitrate and Flux—)

In the step 1b, potassium nitrate and the flux are charged in a vessel, and mixed by a stirring blade or the like. In the case of using a plurality of fluxes, the order of addition thereof is not limited, and those may be simultaneously added. As the vessel, the same one as used in the step 1a above can be used.

(Step 2b—Melting of Mixed Salt of Potassium Nitrate and Flux—)

In the step 2b, the mixed salt obtained in the step 1b is heated and melted. The melting is conducted at a temperature within a range between the melting point (330° C.) of potassium nitrate and the boiling point (500° C.) thereof. Particularly, setting the melting temperature to 350 to 470° C. is more preferred from the standpoints of the balance between surface compressive stress (CS) that can be applied to a glass and a depth of a compressive stress layer (DOL), and strengthening time. The stirring time is preferably 1 minute to 10 hours, and more preferably 10 minutes to 2 hours.

In the molten salt obtained by passing through the step 1a and the step 2a, or the step 1b and the step 2b, in the case where precipitates are formed by the addition of the flux, prior to conducting the chemical strengthening treatment of a glass, the molten salt is allowed to stand until the precipitates settle on the bottom of the vessel. The precipitates contain the flux that exceeds a saturated solubility and a salt in which cations of the flux have been exchanged in the molten salt.

The molten salt used in the production method of the present embodiment has Na concentration of preferably 500 weight ppm or more, and more preferably 1000 weight ppm or more. When the Na concentration in the molten salt is 500 weight ppm or more, a low density layer is easy to deepen by an acid treatment step described hereinafter, which is therefore preferable. The upper limit of the Na concentration is not particularly limited, and can be allowable until desired surface compressive stress (CS) is obtained.

The molten salt having been subjected to the chemical strengthening one time or more contains sodium eluted from a glass. Therefore, when the Na concentration is already within the above range, sodium derived from a glass may be directly used as Na source. In the case where the Na concentration is not sufficient or in the case of using a molten salt that is not used in chemical strengthening, it can be adjusted by adding an inorganic sodium salt such as sodium nitrate.

Thus, the molten salt can be prepared by the step 1a and the step 2a, or the step 1b and the step 2b.

(Chemical Strengthening)

Chemical strengthening treatment is then conducted by using the molten salt prepared. The chemical strengthening treatment is conducted by dipping a glass in a molten salt and substituting metal ions (Na ions) in the glass with metal ions (K ions) having large ionic radius in the molten salt. The ion exchange can change a composition of the glass surface and can form a compressive stress layer 20 in which a density of the glass surface has been increased [(a) of FIG. 1 to (b) of FIG. 1]. Compressive stress is generated by the densification of the glass surface, and the glass can be strengthened.

Actually, the density of the chemical strengthened glass is gradually increased toward the surface of the compressive stress layer from an outer edge of an intermediate layer 30 (bulk) present in the center of the glass. Therefore, clear boundary at which a density rapidly changes is not present between the intermediate layer 30 and the compressive stress layer 20. The intermediate layer used herein represents a layer present in the central portion of the glass and sandwiched between the compressive stress layers. The intermediate layer is a layer that is not ion-exchanged, differing from the compressive stress layer.

The chemical strengthening treatment in the present embodiment can be specifically conducted by the following step 3.

Step 3: Chemical strengthening treatment of glass (Step 3—Chemical Strengthening Treatment of Glass—)

In the step 3, a glass is preheated, and the molten salt prepared in the step 1a and step 2a, or the step 1b and step 2b is adjusted to a temperature for conducting chemical strengthening. The preheated glass is then dipped in the molten salt for a given period of time, and the glass is taken out of the molten salt and cooled by allowing to stand. It is preferred that before the chemical strengthening treatment, the glass is subjected to shape processing according to uses, for example, mechanical processing such as cutting, edge surface processing or drilling.

The preheating temperature of the glass depends on the temperature when dipping in the molten salt, but generally is preferably 100° C. or higher.

The chemical strengthening temperature is preferably equal to or lower than a strain point (generally 500 to 600° C.) of a glass to be strengthened, and is particularly preferably 350° C. or higher in order to obtain larger depth of the compressive stress layer.

The dipping time in the molten slat of the glass is preferably 1 minute to 10 hours, more preferably 5 minutes to 8 hours, and still more preferably 10 minutes to 4 hours. Within the range, a chemically strengthened glass having excellent balance between strength and the depth of a compressive stress layer can be obtained.

In the production method of the present embodiment, the following steps are subsequently conducted after the chemical strengthening treatment.

Step 4: Cleaning of glass
Step 5: Acid treatment of glass after passing through step 4

At the time when the step 5 has been passed, the glass surface further has a low density layer 10 in which a topmost surface layer of the compressive stress layer has been denatured, specifically density-decreased [(b) of FIG. 1 to (c) of FIG. 1]. The low density layer is formed by that Na and K are eliminated (leached) from the outermost surface of the compressive stress layer and H enters (substituting) instead of those.

It is considered that the presence of the low density layer contributes to high transmittance of the chemically strengthened glass of the present embodiment.

The step 4 and step 5 are described in detail below.

(Step 4—Cleaning of Glass—)

In the step 4, cleaning of a glass is conducted by using industrial water, ion-exchanged water or the like. Above all, ion-exchanged water is preferred. The conditions of cleaning vary depending on a cleaning liquid used. In the case of using ion-exchanged water, cleaning at a temperature of 0 to 100° C. is preferred from the standpoint that salt deposited is completely removed.

(Step 5—Acid Treatment—)

In the step 5, the glass cleaned in the step 4 is further subjected to an acid treatment.

The acid treatment of a glass is conducted by dipping the chemically strengthened glass in an acidic solution, and thereby Na and/or K on the surface of the chemically strengthened glass can be substituted with H.

The solution is not particularly limited so long as it is acidic, and so long as it has pH of less than 7. The acid used may be weak acid and may be strong acid. Specifically, acids such as hydrochloric acid, nitric acid, sulfuric acid, phosphoric acid, acetic acid, oxalic acid, carbonic acid, and citric acid are preferably used. Those acids may be used alone or may be used as combination of plurality of those.

The temperature for conducting the acid treatment varies depending on the kind and the concentration of an acid used and time, but it is preferred to conduct it at 100° C. or lower.

The time for conducting the acid treatment varies depending on the kind and the concentration of an acid used and a temperature, but it is preferably 10 seconds to 5 hours from the standpoint of productivity, and is more preferably 1 minute to 2 hours.

The concentration of the solution for conducting the acid treatment varies depending on the kind of an acid used, time and a temperature, but the concentration with less concern of corrosion of a vessel is preferred. Specifically, 0.05 wt % to 20 wt % is preferred.

After completion of the acid treatment step 5, a cleaning step similar to that in the step 4 is preferably provided. The cleaning liquid used in the cleaning step is preferably neutral or weakly acidic, and is particularly preferably water.

Preferably, an alkali treatment is not conducted after completion of the acid treatment step 5 and the cleaning step. The alkali treatment is conducted by dipping a chemically strengthened glass in a basic (more than pH 7) solution.

Examples of the solution include bases such as sodium hydroxide, potassium hydroxide, potassium carbonate, and sodium carbonate, and combinations of those. By conducting the alkali treatment, delta transmittance of a chemically strengthened glass may be deteriorated.

Furthermore, preferably, surface polishing and etching treatment of a chemically strengthened glass are not conducted after completion of the acid treatment step 5 and the cleaning step. By conducting the surface polishing and etching treatment also, delta transmittance of a chemically strengthened glass may be deteriorated.

(Mirror Polishing)

In the production method of the present embodiment, a glass edge surface is preferably subjected to mirror polishing before the chemically strengthening treatment (step 3) conducted for providing a compressive stress layer on a glass surface. Bending strength of a glass can be thereby enhanced. The glass edge surface indicates a face connecting one glass main surface (front surface) and the other glass main surface (back surface). The glass edge surface indicates, for example, a cut face when a mother sheet for a glass sheet has been cut, and includes a chamfered face when chamfering has been conducted after cutting as necessary. The mirror polishing is preferably a polishing step such that an arithmetic mean roughness Ra of an edge surface after cutting is 300 nm or less, preferably 50 nm or less, and more preferably 20 nm or less. In the production method of the present embodiment, each step of ion exchange, cleaning, acid treatment, and the like is conducted after mirror polishing, but the arithmetic mean roughness of the edge surface is rarely affected by those steps. Therefore, the surface roughness of the edge surface after mirror polishing almost equals to the surface roughness of the edge surface of the chemically strengthened glass of the present embodiment obtained by passing through all steps.

The mirror polishing method is not particularly limited so long as the arithmetic mean roughness Ra of the edge surface after polishing can achieve the above range. Examples thereof specifically include a method of bringing a continuously moving brush into contact with a glass edge surface while supplying an abrasive containing polishing abrasive grains, a method of polishing with so-called free abrasive grains, and a method of polishing with fixed abrasive grains (abrasive stone) with abrasive grains having large number fixed thereto. An etching treatment may be applied to the edge surface, in place of polishing. By appropriately selecting those methods and adjusting polishing time and the like, the mirror polishing can be conducted such that the arithmetic mean roughness Ra of the edge surface after polishing is within the above range.

Figure 3:
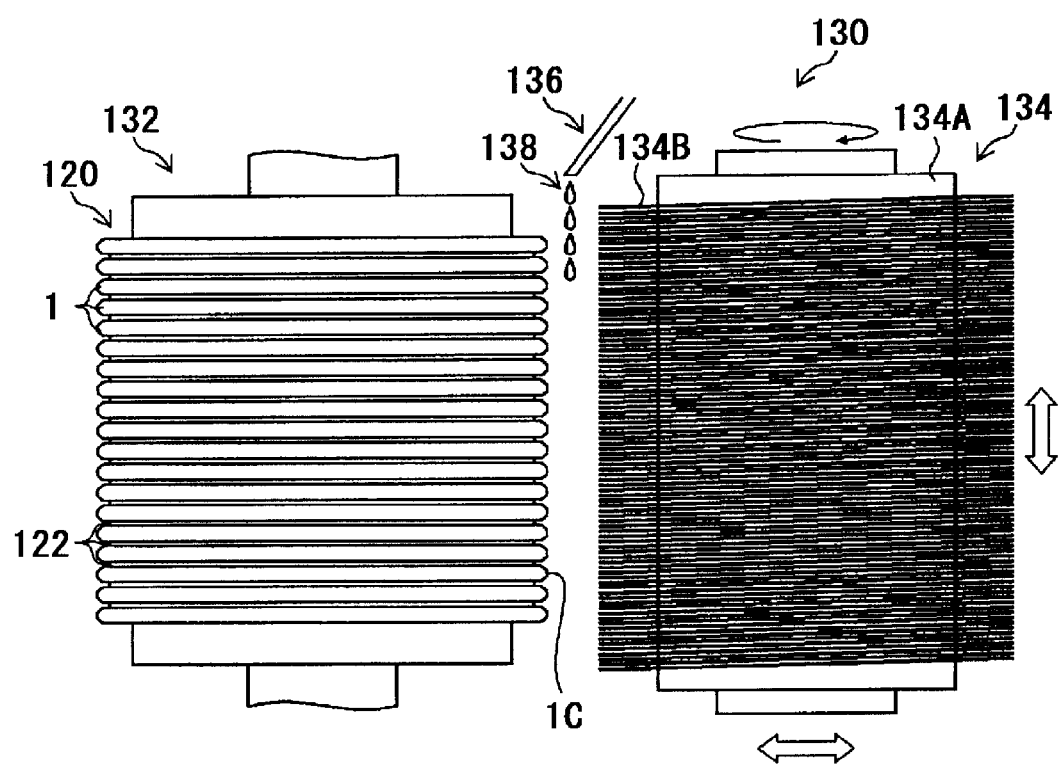
FIG. 3 is a side view illustrating the constitution of a brush polishing apparatus.

A method of bringing a continuously moving brush into contact with a glass edge surface while supplying an abrasive containing polishing abrasive grains is specifically described. FIG. 3 is a side view of a brush polishing apparatus 130 that polishes an edge surface 1C of a glass sheet 1. The brush polishing apparatus 130 illustrated in the drawing is an apparatus in which a plurality of the glass sheets 1 is laminated to constitute a laminate 120, the periphery part of the laminate 120 is polished by a polishing brush 134 that rotates, and the edge surface 1C of each glass sheet 1 is polished together. In constituting the laminate 120, the glass sheets 1 are laminated by interposing interval adjusting members 122, and the intervals in a lamination direction are adjusted to a given value.

The brush polishing apparatus 130 includes a laminate holding part 132, the polishing brush 134, a driving part (not shown) driving the polishing brush 134, and a polishing liquid supply part 136 supplying a polishing liquid 138.

The laminate holding part 132 detachably holds the laminate 120. In the example illustrated in the drawing, it holds the laminate 120 by sandwiching from both sides in a lamination direction.

The polishing brush 134 is composed of a shaft 134A, and many brush bristles 134B provided radially on the periphery of the shaft 134A. The shaft 134A is formed in a cylindrical shape having a predetermined outer diameter. The brush bristles 134B are provided on the periphery of the shaft 134A by spirally winding ones implanted in a ribbon shape around the periphery of the shaft 134A. The brush bristles 134B are constituted of, for example, a flexible wire material made of a polyamide resin or the like. The wire material may contain particles such as alumina ($Al_2O_3$), silicon carbide (SiC) and diamond.

The polishing liquid supply part 136 supplies the polishing liquid to a contact part between the polishing brush 134 and the laminate 120. The polishing liquid 138 contains abrasives and a dispersion medium, and is adjusted to a predetermined specific gravity. Examples of the abrasives used include cerium oxide and zirconia. The abrasives have an average particle diameter (D50) of, for example, 5 μm or less, and preferably 2 μm or less. The polishing liquid preferably has a specific gravity of 1.1 to 1.4.

The action of the brush polishing apparatus 130 is described below.

First, the polishing brush 134 is rotated at constant rotation speed.

The polishing brush 134 is horizontally moved toward the laminate 120, and the polishing brush 134 is brought into pressure-contact with the periphery part of the laminate 120. In this case, the polishing brush 134 is horizontally moved so as to contact in a predetermined pushing amount.

The polishing liquid 138 is then supplied in a predetermined supply amount to the contact part between the polishing brush 134 and the laminate 120 from the polishing liquid supply part 136.

The polishing brush 134 is reciprocally moved in a predetermined speed in a shaft direction (a lamination direction of the glass sheet 1). Thereby, the edge surfaces 1C of a plurality of the glass sheets 1 can be subjected to polishing treatment together, and glass sheets 1 having an arithmetic mean roughness Ra of the edge surfaces 1C of 300 nm or less can be obtained.

According to the production method of the present invention, safety of a liquid medicine used is high, so that special equipment is not necessary. Therefore, the chemically strengthened glass having high transmittance and markedly enhanced surface strength can be safely and efficiently obtained.

EXAMPLES

The present invention is specifically described below by reference to Examples, but the present invention is not limited thereto.

<Evaluation Method>

Various evaluations in the Examples were conducted by the following analytical methods.

(Evaluation of Glass: Surface Stress)

Compressive stress value of a compressive stress layer and a depth of a compressive stress layer in the chemically strengthened glass of the present Examples can be measured by using a surface stress meter (for example, FSM-6000, manufactured by Orihara Industrial Co., Ltd.) or the like.

Furthermore, an ion exchange depth measured by using EPMA (electron probe micro analyzer) or the like can be used in place of the depth of the compressive stress layer. In the Examples, a surface compressive stress value (CS, unit: MPa) and a depth of a compressive stress layer (DOL, unit: μm) were measured by using a surface stress meter (FSM-6000), manufactured by Orihara Industrial Co., Ltd.
(Evaluation of Glass: Removal Amount)

Removal amount thickness of a glass was obtained by measuring a weight before and after a treatment with a liquid medicine by an electronic analytical balance (HR-202i; manufactured by A&D Company, Limited), followed by converting into a thickness by using the following equation.

(Removal amount thickness per one side)=[(Weight before treatment)−(Weight after treatment)]/ (Specific gravity of glass)/Treated area/2

In this case, the calculation was conducted with the specific gravity of the glass being 2.48 (g/cm$^3$).
(Evaluation of Glass: Surface Strength)

As for the surface strength of a glass, the surface strength was measured according to the method described in the item of (Ball on Ring test) described before.
(Evaluation of Glass: Hydrogen Concentration)

Hydrogen concentration profile was measured according to the method described in the item of [Measurement method of hydrogen concentration profile] described before, and the relational equation (I) was derived.
(Evaluation of Glass: Delta Transmittance)

The transmittance was measured according to the method described in the item of [Calculation method of delta transmittance] described before, and delta transmittance was calculated. The etching treatment was conducted by dipping the glass in an aqueous solution containing 10 wt % of HF and 18.5 wt % of HCl at 25° C. for about 300 seconds, followed by cleaning with ion-exchanged water. The removal amount at one side of a glass is 0.09 mm.
(Evaluation of Glass: Surface Roughness of Glass Edge Surface)

The surface roughness of a glass edge surface was measured based on JIS B0601 (2001).

The apparatus used was Surfest SV-600, manufactured by Mitsutoyo Corporation. A measurement sample was set to a predetermined position, reference length, interval number and pitch defined in JIS B0601 (2001) were set, and measurement was conducted. Measurement scan speed was 0.5 mm/sec.

Example 1

(Chemically Strengthening Step)

5100 g of potassium nitrate, 270 g of potassium carbonate and 210 g of sodium nitrate were added to SUS cup, and heated to 450° C. by a mantle heater to prepare a molten salt containing 6 mol % of potassium carbonate and 10000 weight ppm of sodium. Aluminoborosilicate glass X having a size of 50 mm×50 mm×0.56 mm was prepared, preheated to 200 to 400° C., and then dipped in the molten salt at 450° C. for 2 hours to perform an ion exchange treatment, followed by cooling to approximate room temperature, thereby performing a chemical strengthening treatment. The chemically strengthened glass obtained was washed with water and subjected to a next step.

Composition of aluminoborosilicate glass X (in mol %): $SiO_2$: 67%, $B_2O_3$: 4%, $Al_2O_3$: 13%, $Na_2O$: 14%, $K_2O$: <1%, MgO: 2%, and CaO: <1%

(Acid Treatment Step)

1.5 wt % nitric acid ($HNO_3$; manufactured by Kanto Chemical Co., Ltd.) was prepared in a beaker, and the temperature was adjusted to 41° C. by using a water bath. The glass obtained in the chemically strengthening step was dipped in the nitric acid prepared for 120 seconds to perform an acid treatment, cleaned with pure water several times, and then dried by air blowing.

Thus, a chemically strengthened glass of Example 1 was obtained.

Example 2

A chemically strengthened glass was produced in the same manner as in Example 1, except that 0.5 wt % nitric acid was used in place of 1.5 wt % nitric acid.

Example 3

A chemically strengthened glass was produced in the same manner as in Example 1, except that 3.6 wt % hydrochloric acid (HCl; manufactured by Kanto Chemical Co., Ltd.) was used in place of 1.5 wt % nitric acid.

Comparative Example 1

A chemically strengthened glass was produced in the same manner as in Example 1, except that the amount of sodium in the molten salt is the value shown in Table 1 and the amount of potassium carbonate added is 0 g in the chemically strengthening step, and an acid treatment step was not conducted.

Comparative Example 2

A chemically strengthened glass was produced in the same manner as in Comparative Example 1, except that hydrofluoric acid etching treatment was conducted under the following conditions after the chemically strengthening step.

Hydrofluoric acid etching: A glass sheet after chemically strengthening was dipped in an aqueous solution containing 1.0 wt % HF and 18.5 wt % HCl at 25° C. for 120 seconds, and then cleaned with ion-exchanged water.

Reference Example 1

A chemically strengthened glass was produced in the same manner as in Example 1, except that the following alkali treatment step was conducted after the acid treatment step.

(Alkali Treatment Step)

4.0 wt % sodium hydroxide aqueous solution was prepared in a beaker, and the temperature was adjusted to 40° C. by using a water bath. The glass obtained in the acid treatment step was dipped in the sodium hydroxide aqueous solution prepared for 120 seconds to perform an alkali treatment, cleaned with pure water several times, and then dried by air blowing.

Various evaluations were conducted as for the chemically strengthened glasses thus obtained. The results are shown in Table 1.

Graphs in which a hydrogen concentration profile of a surface layer of each chemically strengthened glass obtained in Example 1, Example 2, Example 3, Comparative Example 1, Comparative Example 2, and Reference Example was plotted are shown in FIG. 4 and FIG. 5.

TABLE 1

|  |  |  | Ex. 1 | Ex. 2 | Ex. 3 | Com. Ex. 1 | Com. Ex. 2 | Ref. Ex. 1 |
|---|---|---|---|---|---|---|---|---|
| Chemically strengthening | $K_2CO_3$ | mol % | 6 | 6 | 6 | 0 | 0 | 6 |
|  | Na amount | wt ppm | 10000 | 10000 | 10000 | 4000 | 4000 | 10000 |
|  | Temperature | °C. | 450 | 450 | 450 | 450 | 450 | 450 |
|  | Time | min | 120 | 120 | 120 | 120 | 120 | 120 |
| Acid treatment | Liquid medicine | Kind | $HNO_3$ | $HNO_3$ | HCl | — | — | $HNO_3$ |
|  | Concentration | wt % | 1.5 | 0.5 | 3.6 | — | — | 6 |
|  | Temperature | °C. | 41 | 41 | 41 | — | — | 41 |
|  | Time | sec | 120 | 120 | 120 | — | — | 120 |
| Alkali treatment | Liquid medicine | Kind | — | — | — | — | — | NaOH |
|  | Concentration | wt % | — | — | — | — | — | 4 |
|  | Temperature | °C. | — | — | — | — | — | 40 |
|  | Time | sec | — | — | — | — | — | 120 |
| HF etching treatment |  |  | — | — | — | — | HF/HCl = 1.0/18.5 | — |
| Formula (I) | a |  | −0.145 | −0.104 | −0.073 | −0.396 | −0.009 | −0.173 |
|  | b |  | 0.150 | 0.130 | 0.132 | 0.252 | 0.050 | 0.147 |
| Δ Transmittance | @400 nm | % | +0.25 | +0.19 | +0.32 | 0 | 0 | 0 |
| Sheet thickness |  | mm | 0.55 | 0.55 | 0.55 | 0.55 | 0.55 | 0.55 |
| Surface strength |  | N | 740 | 639 | 557 | 362 | 931 | 950 |
|  |  | $X:F > Xt^2$ | 2446 | 2112 | 1841 | 1197 | 3078 | 3140 |
| Surface removal amount |  | nm | 92 | 90 | 93 | — | 1420 | 186 |
| CS |  | MPa | 742 | 739 | 739 | 764 | 751 | 736 |
| DOL |  | μm | 37.5 | 37.5 | 37.5 | 38.7 | 37.1 | 37.6 |
| Surface roughness | Edge surface | nm | 523 | 587 | 509 | 551 | 571 | 560 |

It is seen that the transmittance was high and the surface strength was greatly enhanced in the chemically strengthened glasses of the Examples.

The Example to which an edge surface polishing step was added is described below.

Example 4

(Edge Surface Polishing Step)

100 sheets of aluminoborosilicate glass X each having a size of 50 mm×50 mm×0.55 mm were prepared, and the edge surfaces thereof were polished by using the brush polishing apparatus 130 illustrated in FIG. 3. A polishing liquid used was one in which water was used as a dispersion medium and an abrasive made of cerium oxide having an average particle diameter (D50) of 1.5 μm was dispersed therein.

Composition of aluminoborosilicate glass X (in mol %): $SiO_2$: 67%, $B_2O_3$: 4%, $Al_2O_3$: 13%, $Na_2O$: 14%, $K_2O$: <1%, MgO: 2%, and CaO: <1%

(Chemically Strengthening Step)

5100 g of potassium nitrate, 270 g of potassium carbonate and 210 g of sodium nitrate were added to SUS cup, and heated to 450° C. by a mantle heater to prepare a molten salt containing 6 mol % of potassium carbonate and 6000 weight ppm of sodium. The aluminoborosilicate glass X after the edge surface polishing step was preheated to 200 to 400° C. and then dipped in the molten salt at 450° C. for 2 hours to perform an ion exchange treatment, followed by cooling to approximate room temperature, thereby performing a chemical strengthening treatment. The chemically strengthened glass obtained was washed with water and subjected to a next step.

(Acid Treatment Step)

6.0 wt % nitric acid ($HNO_3$; manufactured by Kanto Chemical Co., Ltd.) was prepared in a beaker, and the temperature was adjusted to 40° C. by using a water bath. The glass obtained in the chemical strengthening step was dipped in the nitric acid prepared for 120 seconds to perform an acid treatment, cleaned with pure water several times, and then dried by air blowing.

Thus, a chemically strengthened glass of Example 4 was obtained.

Comparative Example 3

A chemically strengthened glass was produced in the same manner as in Example 4, except that the amount of sodium in the molten salt was the value shown in Table 2 and the amount of potassium carbonate added was 0 g in the chemically strengthening step, and an acid treatment step was not conducted.

Reference Example 2

A chemically strengthened glass was produced in the same manner as in Example 4, except that the following alkali treatment step was conducted after the acid treatment step.

(Alkali Treatment Step)

4.0 wt % sodium hydroxide aqueous solution was prepared in a beaker, and the temperature was adjusted to 40° C. by using a water bath. The glass obtained in the acid treatment step was dipped in the sodium hydroxide aqueous solution prepared for 120 seconds to perform an alkali treatment, cleaned with pure water several times, and then dried by air blowing.

Various evaluations were conducted as for the chemically strengthened glasses thus obtained. The results are shown in Table 2. Although not shown, Example 4 showed a similar hydrogen concentration profile as in Example 3, Comparative Example 3 showed a similar hydrogen concentration profile as in Comparative Example 1, and Reference Example 2 showed a similar hydrogen concentration profile as in Reference Example 1. Furthermore, regarding surface strength, Example 4 was comparable with Example 3, Comparative Example 3 was comparable with Comparative Example 1, and Reference Example 2 was comparable with Reference Example 1.

TABLE 2

|  |  |  | Ex. 4 | Com. Ex. 3 | Ref. Ex. 2 |
|---|---|---|---|---|---|
| Chemically strengthening | $K_2CO_3$ | mol % | 6 | 0 | 6 |
|  | Na concentration | wt ppm | 6000 | 3000 | 6000 |
|  | Temperature | °C. | 450 | 450 | 450 |
|  | Time | min | 120 | 120 | 120 |
| Acid treatment | Liquid medicine | Kind | $HNO_3$ | — | $HNO_3$ |
|  | Concentration | wt % | 6.0 | — | 6.0 |
|  | Temperature | °C. | 40 | — | 40 |
|  | Time | sec | 120 | — | 120 |
| Alkali treatment | Liquid medicine | Kind | — | — | NaOH |
|  | Concentration | wt % | — | — | 4.0 |
|  | Temperature | °C. | — | — | 40 |
|  | Time | sec | — | — | 120 |
| Formula (I) | a |  | −0.073 | −0.396 | −0.173 |
|  | b |  | 0.132 | 0.252 | 0.147 |
| Δ Transmittance | @400 nm | % | +1.1 | 0.0 | 0.0 |
| Sheet thickness |  | mm | 0.56 | 0.56 | 0.56 |
| Edge surface strength |  | MPa | 1251 | 944 | 1077 |
| Surface removal amount |  | nm | 280 | — | 304 |
| CS |  | MPa | 765 | 745 | 756 |
| DOL |  | µm | 39.3 | 39.7 | 39.4 |
| Surface roughness | Edge surface | nm | 15 | 15 | 15 |

It is seen that the chemically strengthened glasses of the Examples have high transmittance and, because the edge surface was mirror polished, the surface strength thereof was greatly enhanced.

While the present invention has been described in detail and with reference to specific embodiments thereof, it will be apparent to one skilled in the art that various changes and modifications can be made therein without departing from the spirit and scope of the present invention. The present application is based on a Japanese patent application (Application No. 2015-008853) filed on Jan. 20, 2015 and a Japanese patent application (Application No. 2015-141400) filed on Jul. 15, 2015, the content thereof being incorporated herein by reference.

INDUSTRIAL APPLICABILITY

According to the present invention, a chemically strengthened glass having high transmittance and greatly enhanced surface strength can be obtained safely and at low cost. The chemically strengthened glass of the present invention can be used in a cover glass for displays such as a mobile phone, a digital camera and a touch panel display.

DESCRIPTION OF REFERENCE NUMERALS AND SIGNS

Glass sheet
1C Edge surface
2 Pressuring jig
3 Receiving jig
10 Low density layer
20 Compressive stress layer
30 Intermediate layer
120 Laminate
122 Interval adjusting member
130 Brush polishing apparatus
132 Laminate holding part
134 Polishing brush
134A Shaft
134B Brush bristles
136 Polishing liquid supply part
138 Polishing liquid

The invention claimed is:

1. A chemically strengthened glass having a compressive stress layer formed on a surface layer thereof by an ion exchange method, wherein:
   the glass comprises sodium and boron, and
   has a delta transmittance measured by the following method being +0.1% or more; and wherein
   a straight line obtained by a linear approximation of a hydrogen concentration Y in a region of a depth X from an outermost surface of the glass satisfies the following relational equation (I) in X=0.1 to 0.4 (µm):

$$Y=aX+b \quad (I)$$

[in the equation (I), meanings of each symbol are as follows:
   Y: hydrogen concentration (in terms of $H_2O$, mol/L);
   X: depth from outermost surface of glass (µm);
   a: −0.390 to −0.010; and
   b: 0.060 to 0.250],
Measurement method of the delta transmittance:
   a chemically strengthened glass is cut into two pieces to prepare glass A and glass B; transmittance at a wavelength of 400 nm of the glass A is measured by using an ultraviolet-visible spectrophotometer (SolidSpec-3700), manufactured by Shimadzu Corporation; the glass B is subjected to an etching treatment with a mixed liquid of HF and HCl such that a removal amount in one side of the glass is 0.05 to 0.10 mm; the glass B having been subjected to the etching treatment is subjected to a chemically strengthening treatment; in the chemically strengthening treatment, the glass B is brought into contact with a molten salt, obtained by heating an inorganic salt of 100 wt % potassium nitrate at 450° C., for 2 hours; the transmittance at a wavelength of 400 nm of the glass B after the chemically strengthening treatment is measured in the same method as in the glass A; and the delta transmittance is obtained by subtracting the transmittance of the glass B from the transmittance of the glass A.

2. The chemically strengthened glass according to claim 1, wherein the glass is a borosilicate glass or an aluminoborosilicate glass.

3. The chemically strengthened glass according to claim 1, wherein an edge surface connecting main surfaces on a front side and a back side of the glass has an arithmetic mean roughness Ra being 300 nm or less.

4. A production method of a chemically strengthened glass comprising a step of bringing a glass containing sodium and boron into contact with an inorganic salt containing potassium nitrate, to ion-exchange Na in the glass with K in the inorganic salt, wherein the inorganic salt further comprises at least one kind of salt selected from the group consisting of $K_2CO_3$, $Na_2CO_3$, $KHCO_3$, $NaHCO_3$, $K_1PO_4$, $Na_3PO_4$, $K_2SO_4$, $Na_2SO_4$, KOH, and NaOH, and the method further comprises:

a step of cleaning the glass after the ion exchange; and a step of acid-treating the glass after the cleaning.

5. The production method of a chemically strengthened glass according to claim 4, further comprising, before the ion exchange step, a step of mirror polishing an edge surface connecting main surfaces on a front side and a back side of the glass such that an arithmetic mean roughness Ra thereof is 300 nm or less.

6. The chemically strengthened glass according to claim 1, satisfying a relation of $F \geq 1500 \times t^2$, wherein F is a BOR surface strength (N) measured by a BOR test and t is a sheet thickness (mm) of the glass.

7. The chemically strengthened glass according to claim 1, having a four-point bending strength measured by the test method defined in JIS 81601 (2008) of 300 MPa or more.

8. The chemically strengthened glass according to claim 1, having a surface roughness of a main surface in a measurement range of 10 μm×5 μm measured by an AFM surface observation of 0.21 nm to 1.0 nm.

9. The chemically strengthened glass according to claim 1, having a thickness of 5 mm or less.

* * * * *